(12) United States Patent
Fujii et al.

(10) Patent No.: US 9,919,473 B2
(45) Date of Patent: Mar. 20, 2018

(54) METHOD FOR PRODUCING FIBER-REINFORCED RESIN BONDED BODY

(71) Applicant: HONDA MOTOR CO., LTD., Tokyo (JP)

(72) Inventors: Toshiaki Fujii, Wako (JP); Daiya Yamashita, Wako (JP); Hiroshi Kato, Wako (JP); Satoshi Miyazu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 315 days.

(21) Appl. No.: 14/831,239

(22) Filed: Aug. 20, 2015

(65) Prior Publication Data

US 2016/0052203 A1 Feb. 25, 2016

(30) Foreign Application Priority Data

Aug. 22, 2014 (JP) .................. 2014-169766

(51) Int. Cl.
*B29C 65/02* (2006.01)
*B29C 65/18* (2006.01)
(Continued)

(52) U.S. Cl.
CPC ............ *B29C 66/721* (2013.01); *B29C 65/02* (2013.01); *B29C 65/18* (2013.01); *B29C 65/70* (2013.01); *B29C 66/1122* (2013.01); *B29C 66/12221* (2013.01); *B29C 66/3034* (2013.01); *B29C 66/43* (2013.01); *B29C 66/72143* (2013.01); *B29C 66/73921* (2013.01);
(Continued)

(58) Field of Classification Search
CPC ......... B29C 65/02; B29C 65/18; B29C 65/20; B29C 65/70; B29C 66/1122; B29C 66/1142; B29C 66/1222; B29C 66/12221; B29C 66/1224; B29C 66/3034; B29C 66/341; B29C 66/43; B29C 66/435; B29C 66/71; B29C 66/721; B29C 66/72143; B29C 66/73921; B29C 66/8322; B29C 70/42; B29C 70/46

See application file for complete search history.

(56) References Cited

U.S. PATENT DOCUMENTS

| | | | | |
|---|---|---|---|---|
| 2014/0154494 A1* | 6/2014 | Kato | ..................... | B23K 11/115 428/300.7 |
| 2014/0356053 A1* | 12/2014 | Urayama | .......... | B29C 66/73921 403/270 |
| 2015/0013898 A1* | 1/2015 | Kato | ................... | B29C 66/7212 156/274.4 |

FOREIGN PATENT DOCUMENTS

JP  11-090986  4/1999

* cited by examiner

*Primary Examiner* — Michael A Tolin
(74) *Attorney, Agent, or Firm* — Rankin, Hill & Clark LLP

(57) ABSTRACT

First and second composite members each containing first discontinuous fibers of fiber length La, are placed such that end surfaces thereof face each other at an interval of first length L1. Ends of the first and second composite members are melted over a second length L2 from the end surfaces. A connecting member containing second discontinuous fibers of fiber length Lb, is melted and placed to bridge a space between the ends, to form a stack. The stack is pressed, whereby the melted connecting member and the melted end portions flow into the space between the end surfaces to form a mixture portion. The mixture portion is cooled and solidified to produce a fiber-reinforced resin bonded body. The first length L1 is equal to or more than ½ of the fiber length Lb, and the second length L2 is equal to or more than the fiber length La.

5 Claims, 6 Drawing Sheets

(51) Int. Cl.
*B29C 65/70* (2006.01)
*B29C 70/42* (2006.01)
*B29C 65/00* (2006.01)
*B29C 70/46* (2006.01)
B29C 65/30 (2006.01)
B29C 65/48 (2006.01)
B29C 65/50 (2006.01)

(52) U.S. Cl.
CPC .......... *B29C 66/8322* (2013.01); *B29C 70/42* (2013.01); *B29C 70/46* (2013.01); B29C 65/305 (2013.01); B29C 65/4815 (2013.01); B29C 65/5042 (2013.01); B29C 65/5071 (2013.01); B29C 65/5078 (2013.01); B29C 66/1142 (2013.01); B29C 66/1222 (2013.01); B29C 66/1224 (2013.01); B29C 66/341 (2013.01); B29C 66/435 (2013.01); B29C 66/71 (2013.01); B29C 66/7212 (2013.01)

METHOD FOR PRODUCING FIBER-REINFORCED RESIN BONDED BODY

CROSS-REFERENCE TO RELATED APPLICATION

This application is based upon and claims the benefit of priority from Japanese Patent Application No. 2014-169766 filed on Aug. 22, 2014, the contents of which are incorporated herein by reference.

BACKGROUND OF THE INVENTION

Field of the Invention

The present invention relates to a method for producing a fiber-reinforced resin bonded body, for bonding composite members each containing a thermoplastic resin and discontinuous fibers to obtain a fiber-reinforced resin bonded body.

Description of the Related Art

Studies have been made on fiber-reinforced resins usable in car body components and the like for the purpose of weight reduction, strength increase, etc. Among the fiber-reinforced resins, particularly fiber-reinforced thermoplastic resins (FRTPs) have attracted much attention. The FRTP contains as a base material a thermoplastic resin, which can be more easily shaped in a shorter time than thermosetting resins. In a composite member composed of the FRTP, the thermoplastic resin used as the base material can be melted by heating. Therefore, separately produced composite members composed of the FRTP can be easily weld-bonded to each other. Consequently, a fiber-reinforced resin bonded body can be produced by bonding a plurality of the composite members to each other, and thus even a large car body component can be easily produced at low cost.

In this case, substantially uniformly distributing reinforcing fibers intertwined with each other in a connection between the composite members in the weld bonding process is considered as one way to improve the bonding strength of the composite members and thus the mechanical properties of the fiber-reinforced resin bonded body.

For example, a method for weld-bonding such composite members is proposed in Japanese Laid-Open Patent Publication No. 11-090986. In this weld bonding method, connection ends of a first composite member and a second composite member are overlapped with each other, and contact surfaces of the composite members are bonded to each other, so that a connection is formed to produce a fiber-reinforced resin bonded body. Specifically, first, connection surfaces at the connection ends of the composite members are heated to melt the thermoplastic resin, whereby the reinforcing fiber is partially exposed on the connection surfaces. Then, the connection ends are overlapped with each other in such a manner that the connection surfaces are brought into contact with each other, and the composite members are press-formed and weld-bonded. As a result, the reinforcing fibers are intertwined with each other and substantially uniformly distributed in the connection between the overlapped connection ends in the produced fiber-reinforced resin bonded body.

SUMMARY OF THE INVENTION

In the above weld bonding method, the connection is formed between the overlapped connection ends. Therefore, in the resultant fiber-reinforced resin bonded body, the stack connection portion and the other portions form a step structure inevitably. Thus, the fiber-reinforced resin bonded body has the step structure in the connection portion. The step structure may deteriorate the appearance design of the fiber-reinforced resin bonded body disadvantageously. Furthermore, in the case of using such a fiber-reinforced resin bonded body as the car body component or the like, the step structure may deteriorate the aerodynamic properties of the car body. In addition, the thickness increase in the connection portion cannot be avoided in this method. Consequently, the fiber-reinforced resin bonded body cannot be easily produced with a desired shape and a satisfactorily reduced weight.

A principal object of the present invention is to provide a method for producing a fiber-reinforced resin bonded body, which is capable of substantially uniformly distributing discontinuous fibers intertwined with each other in a connection between connection ends without forming step structures.

According to an aspect of the present invention, there is provided a method for producing a fiber-reinforced resin bonded body, for heating connection ends of a first composite member and a second composite member and thereafter press-bonding the connection ends between a lower mold and an upper mold. The first and second composite members each contain a first thermoplastic resin and first discontinuous fibers having a fiber length La. The method includes a heating step, a stacking step, a pressing step, and a solidifying step. In the heating step, the first and second composite members are placed on the lower mold in such a manner that end surfaces of the connection ends are arranged facing each other at an interval of a first length, the lower mold is heated by a first heater to melt portions of the first and second composite members in such a manner that the melted portions extend inward from the end surfaces over a second length, and a connecting member containing a second thermoplastic resin and second discontinuous fibers having a fiber length Lb is heated and melted by a second heater. In the stacking step, the melted connecting member is placed so as to bridge a space between the melted connection ends to thereby form a stack. In the pressing step, the lower and upper molds are moved closer to each other to press the stack, whereby the melted portions of the connection ends and the melted connecting member are caused to flow into the space between the end surfaces and are mixed with each other to form a mixture portion. In the solidifying step, the mixture portion is cooled and solidified, whereby the first and second composite members are bonded by the mixture portion to produce the fiber-reinforced resin bonded body. The first length is equal to or more than ½ of the fiber length Lb, and the second length is equal to or more than the fiber length La.

In the fiber-reinforced resin bonded body production method of the present invention, the heating step is carried out first. Specifically, the first and second composite members are placed on the lower mold in such a manner that the end surfaces of the connection ends are arranged facing each other at the interval of the first length, that is to say, the connection ends are not overlapped with each other.

The first length is equal to or more than ½ of the fiber length Lb of the second discontinuous fiber in the connecting member.

Then, the lower mold is heated by the first heater to melt the first thermoplastic resin in portions of the first and second composite members that extend from the end surfaces over the second length. The second length is equal to or more than the fiber length La of the first discontinuous fiber in the first and second composite members. In parallel therewith, the connecting member is heated and melted by the second heater.

In the stacking step, the melted connecting member is placed so as to bridge a space between the melted portions of the connection ends, whereby the stack is formed in the melt state on the lower mold.

In the pressing step, the lower and upper molds are moved closer to each other, and a pressing force is applied to the stack. In this step, the melted connecting member and the melted portions of the connection ends are mixed with each other and caused to flow into the space between the end surfaces of the connection ends, so that the space is filled with the melted ones. As a result, the mixture portion containing the melted portions and the connecting member is formed between the connection ends. As previously described, the mixture portion is formed by flattening the stack under the pressing force. Therefore, the thickness of the mixture portion is substantially equal to those of the first and second composite members.

When the melted portions and the connecting member are made to flow as described above, also the first and second discontinuous fibers contained therein can be transferred. Even when the second discontinuous fibers are transferred by flow of the melted portions and the connecting member, since the end surfaces of the connection ends are arranged at the predetermined interval (first length) as described above, the second discontinuous fibers can be prevented from being excessively deformed. Thus, the second discontinuous fibers can be effectively introduced into the space between the end surfaces of the connection ends and can be intertwined with the first discontinuous fiber.

Since the second length is set as described above, the melted portions have sufficiently large sizes with respect to the fiber length La of the first discontinuous fiber. Therefore, the ratio of first discontinuous fibers that are prevented from being transferred because the fibers extend from the melted portions to the unmelted portions, to all the first discontinuous fibers in the melted portions can be effectively reduced. Thus, the first discontinuous fibers can be suitably transferred and can be effectively intertwined with the second discontinuous fibers.

Consequently, by setting the first and second lengths as described above, the first and second discontinuous fibers can be effectively mutually intertwined and can be substantially uniformly dispersed in the mixture portion.

In the solidifying step, thus-obtained mixture portion is cooled and solidified, whereby the first and second composite members are bonded by the mixture portion to produce the fiber-reinforced resin bonded body. Thus, in this fiber-reinforced resin bonded body, the mixture portion can function as a connection of the first and second composite members. Consequently, the bonding strength between the first and second composite members can be effectively increased, and the fiber-reinforced resin bonded body can be easily obtained with excellent mechanical properties.

Since the mixture portion is substantially equal in thickness to the first and second composite members as described above, the fiber-reinforced resin bonded body can be produced without forming any step structures in the connection of the connection ends. Therefore, deterioration of the appearance design, aerodynamic properties, and the like of the fiber-reinforced resin bonded body can be effectively prevented. In addition, thickness increase in the connection portion can be avoided. Therefore, the fiber-reinforced resin bonded body can be easily produced with a desired shape and a satisfactorily reduced weight.

According to another aspect of the present invention, there is provided a method for producing a fiber-reinforced resin bonded body, for heating while pressing connection ends of a first composite member and a second composite member between a lower mold and an upper mold to bond the connection ends. The first and second composite members each contain a first thermoplastic resin and first discontinuous fibers having a fiber length La. The method includes a stacking step, a heating step, a pressing step, and a solidifying step. In the stacking step, the first and second composite members are placed in such a manner that end surfaces of the connection ends are arranged facing each other at an interval of a first length, and a connecting member containing a second thermoplastic resin and second discontinuous fibers having a fiber length Lb is placed so as to bridge a space between the connection ends to thereby form a stack. In the heating step, the stack is sandwiched between the lower and upper molds and is heated to melt the connecting member and also melt portions of the first and second composite members in such a manner that the melted portions extend inward from the end surfaces over a second length. In the pressing step, the lower and upper molds are moved closer to each other to press the stack, whereby the melted portions of the connection ends and the melted connecting member are caused to flow into the space between the end surfaces and are mixed with each other to form a mixture portion. In the solidifying step, the mixture portion is cooled and solidified, whereby the first and second composite members are bonded by the mixture portion to produce the fiber-reinforced resin bonded body. The first length is equal to or more than ½ of the fiber length Lb, and the second length is equal to or more than the fiber length La.

In the fiber-reinforced resin bonded body production method of the present invention, the stacking step is carried out first. In this stacking step, the end surfaces of the connection ends are arranged facing each other at the interval of the first length, and the connecting member is placed so as to bridge a space between the connection ends. The first length is equal to or more than ½ of the fiber length Lb of the second discontinuous fiber in the connecting member.

In the heating step, the second thermoplastic resin in the connecting member is melted, and the first thermoplastic resin in portions of the first and second composite members that extend from the end surfaces over the second length is melted to form melted portions. The second length is equal to or more than the fiber length La of the first discontinuous fiber in the first and second composite members.

In the pressing step, a pressure is applied to the melted stack by the upper and lower molds from both sides of the stack in the stacking direction. As a result, the melted portions and the melted connecting member are mixed with each other to form the mixture portion between the connection ends. The mixture portion is substantially equal in thickness to the first and second composite members.

In the mixture portion, since the first length is set as described above, the second discontinuous fiber can be prevented from being excessively deformed. Therefore, the second discontinuous fibers can be effectively introduced into the space between the end surfaces of the connection ends and can be intertwined with the first discontinuous fibers. In addition, since the second length is set as described above, the ratio of first discontinuous fibers that are prevented from being transferred because the fibers extend from the melted portions to the unmelted portions, to all the first discontinuous fibers in the melted portions can be effectively reduced. Thus, the first discontinuous fibers can be suitably transferred and effectively intertwined with the second discontinuous fibers. Consequently, by setting the first and second lengths as described above, the first and second discontinuous fibers can be effectively intertwined with each other and can be substantially uniformly dispersed in the mixture portion.

In the solidifying step, thus-obtained mixture portion is cooled and solidified, whereby the first and second composite members are bonded by the mixture portion to produce the fiber-reinforced resin bonded body. Thus, in this fiber-reinforced resin bonded body, the mixture portion can serve as a connection of the first and second composite members. Consequently, the bonding strength between the first and second composite members can be effectively increased, and the fiber-reinforced resin bonded body can be easily obtained with excellent mechanical properties.

Since the thickness of the mixture portion is substantially equal to those of the first and second composite members as described above, the fiber-reinforced resin bonded body can be produced without forming any step structures in the connection of the connection ends. Therefore, deterioration of the appearance design, aerodynamic properties, and the like of the fiber-reinforced resin bonded body can be effectively prevented. In addition, thickness increase in the connection portion can be avoided. Therefore, the fiber-reinforced resin bonded body can be easily produced with a desired shape and a satisfactorily reduced weight.

In the above fiber-reinforced resin bonded body production methods, it is preferred that in the stacking step, the overlap length of an overlapping portion between the connecting member and each of the connection ends should be equal to or more than the thickness of the connecting member and equal to or less than ½ of the second length.

In this case, since the overlap length is equal to or more than the thickness of the connecting member, the contact area between the connecting member and the connection ends can be sufficiently increased in the stack. Therefore, in the pressing step, the connecting member and the connection ends can be suitably flowed and mixed with each other by applying the pressing force to the stack. Thus, the first and second discontinuous fibers can be effectively intertwined with each other in the mixture portion.

Near the boundaries between the melted portions and the unmelted portions, the ratio of first discontinuous fibers that are tied down to the unmelted portions and thus inhibited from flowing, to all the first discontinuous fibers in the melted portions tends to be increased. Consequently, the first discontinuous fibers are not readily transferred or readily intertwined with the second discontinuous fibers near the boundaries even if the connecting member is stacked and the pressing force is applied thereto. As such, by setting the overlap length to be equal to or less than ½ of the second length to thereby sufficiently increase the distance between each end of the connecting member and the vicinity of the boundary, the first and second discontinuous fibers can be effectively intertwined with each other in the mixture portion.

Thus, by setting the overlap length as described above, the mixture portion with the effectively-intertwined first and second discontinuous fibers being substantially uniformly dispersed therein can be formed as the connection. Consequently, the bonding strength between the connection ends can be more effectively increased, and the fiber-reinforced resin bonded body can be obtained with excellent mechanical properties.

In the above fiber-reinforced resin bonded body production methods, it is preferred that the connecting member should have a protrusion projecting from a surface thereof facing the first and second composite members, and the protrusion should be positioned between the end surfaces in the stack. In this case, the melted portions and the melted connecting member can be more suitably mixed with each other. Therefore, the first and second discontinuous fibers can be effectively intertwined with each other and can be substantially uniformly dispersed in the mixture portion. Consequently, the bonding strength between the connection ends can be more effectively increased, and the fiber-reinforced resin bonded body can be obtained with more excellent mechanical properties.

In the above fiber-reinforced resin bonded body production methods, it is preferred that the connecting member should contain a first connecting part and a second connecting part, the total volume of the first and second connecting parts should be substantially equal to the volume obtained by multiplying the area of a facing portion of the end surfaces facing each other by the first length, and in the stacking step, the first connecting part is placed at one side of the stack in the stacking direction, and the second connecting part is placed at the other side thereof in the stacking direction.

In this case, the first and second connecting parts flow into the space between the end surfaces of the connection ends from the both sides of the stack in the stacking direction to thereby form the mixture portion. Therefore, the melted portions and the connecting member can be more suitably mixed with each other, whereby the first and second discontinuous fibers can be intertwined with each other and can be substantially uniformly distributed also in the stacking direction in the mixture portion. Consequently, the bonding strength between the connection ends can be more effectively increased, and the fiber-reinforced resin bonded body can be obtained with more excellent mechanical properties.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Several preferred embodiments of the fiber-reinforced resin bonded body production method of the present invention will be described in detail below with reference to the accompanying drawings.

First Embodiment

Figure 1:
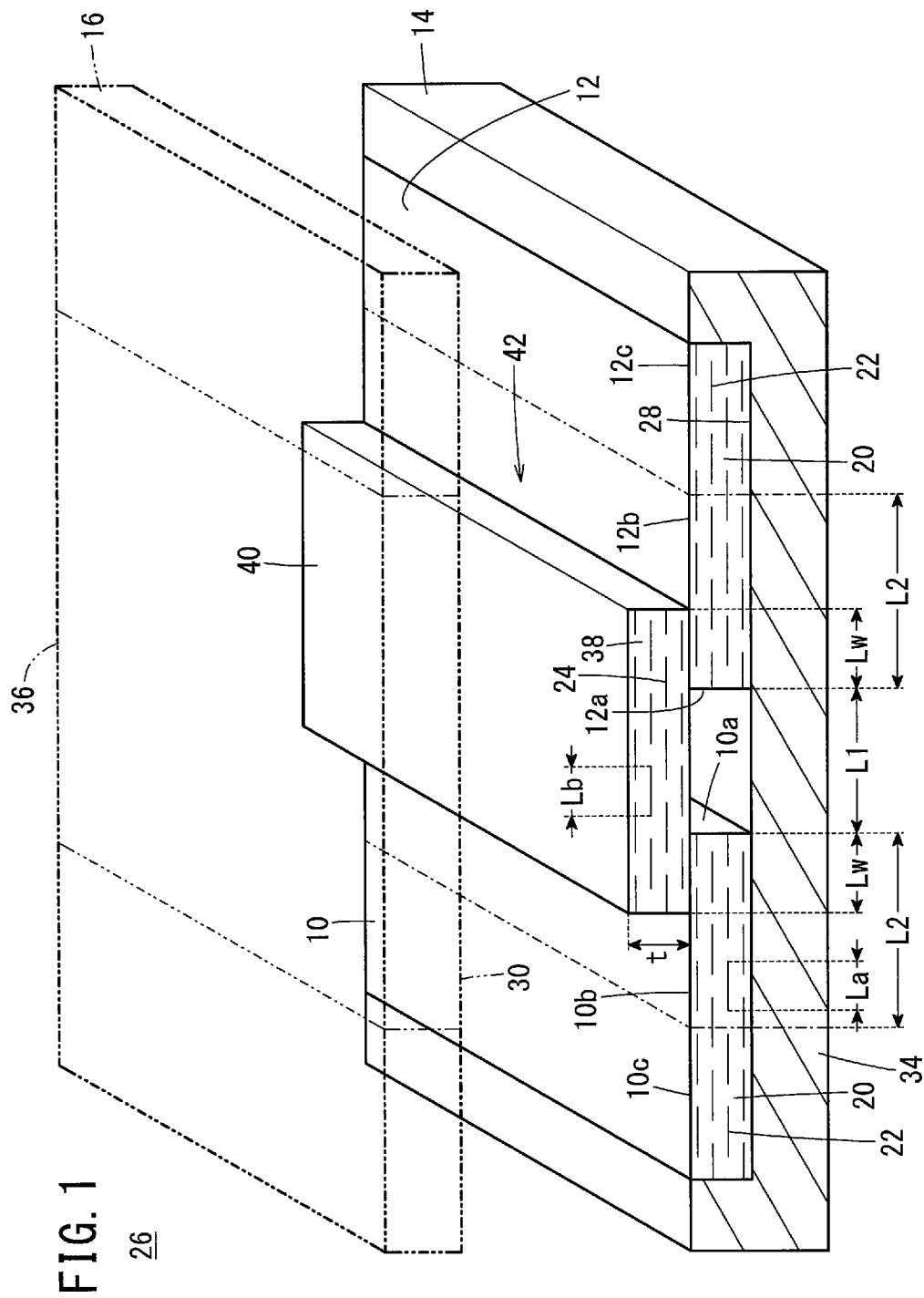
FIG. 1 is a perspective schematic structural view of a stack placed between a lower mold and an upper mold in a fiber-reinforced resin bonded body production method according to first and second embodiments of the present invention.
Figure 2:
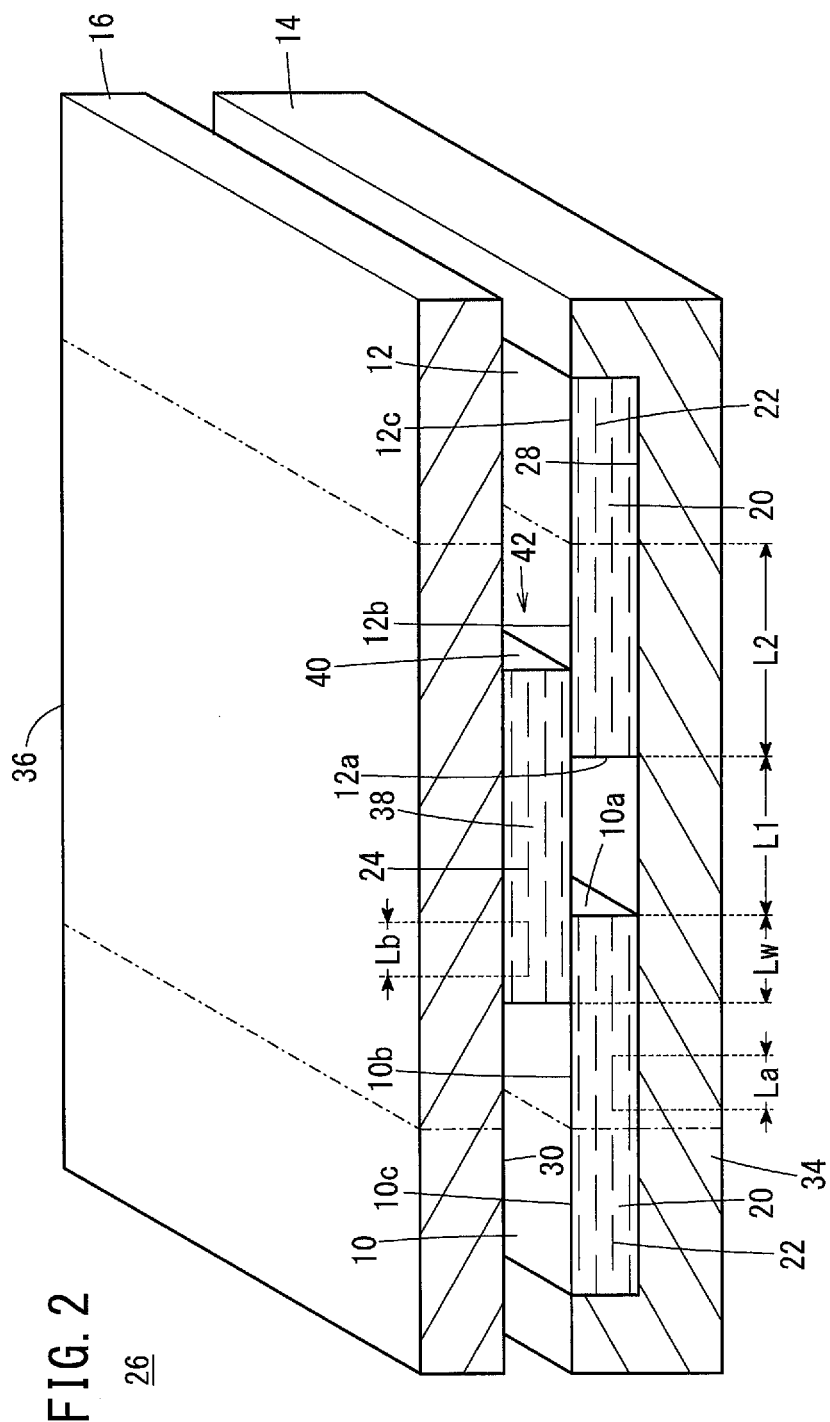
FIG. 2 is a perspective schematic structural view of the stack sandwiched between the lower mold and the upper mold of FIG. 1 by moving the lower and upper molds closer to each other.
Figure 3:
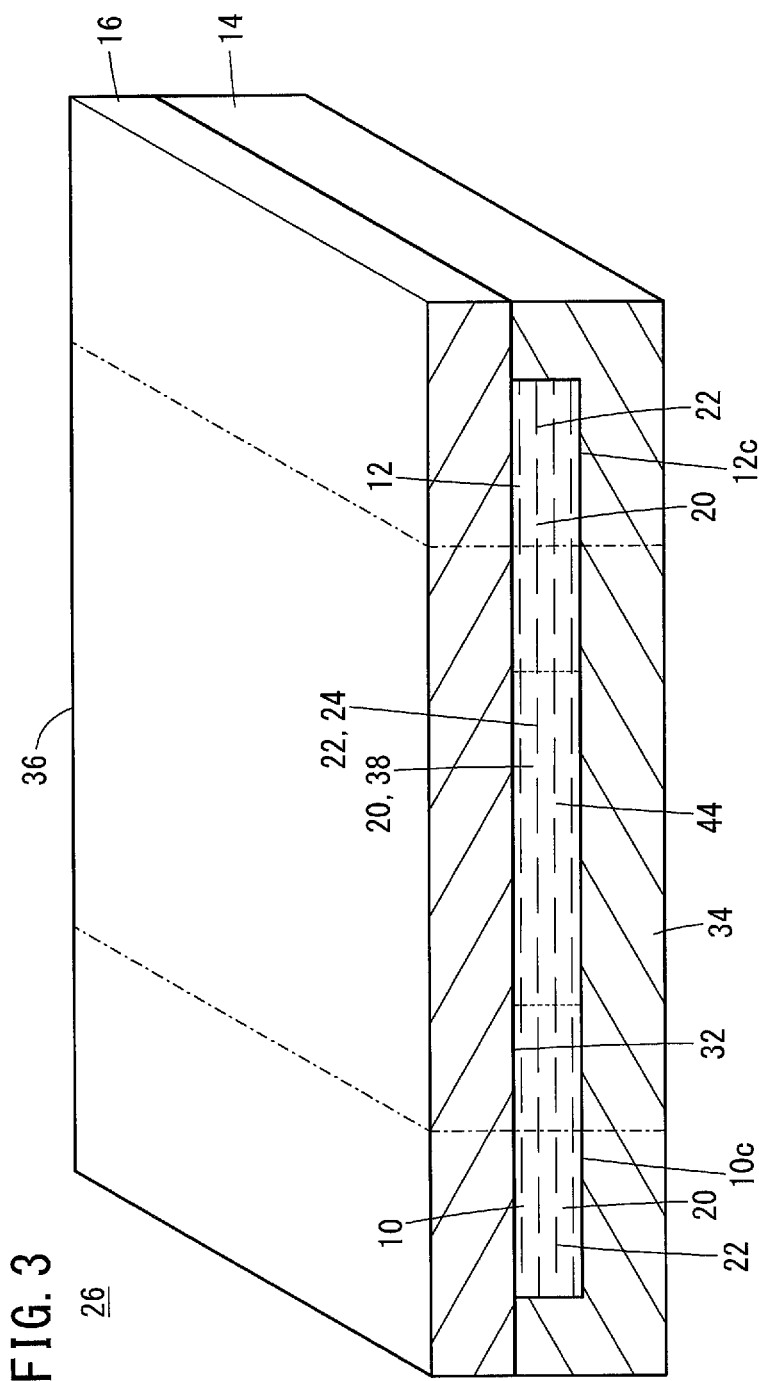
FIG. 3 is a perspective schematic structural view showing a condition in which the lower and upper molds of FIG. 2 are moved further closer to each other.

A fiber-reinforced resin bonded body production method (hereinafter referred to also simply as a production method) according to a first embodiment of the present invention will be described below with reference to FIGS. 1 to 4. In the production method of the first embodiment, as shown in FIGS. 1 to 3, connection ends of a first composite member 10 and a second composite member 12 are heated and then bonded under pressure between a lower mold 14 and an upper mold 16 to produce a fiber-reinforced resin bonded body 18 shown in FIG. 4. The connection ends of the first composite member 10 and the second composite member 12 are bonded to each other by a connecting member 40.

First, the first composite member 10, the second composite member 12, and the connecting member 40 will be described below. The first composite member 10 and the second composite member 12 are each made up of a fiber-reinforced thermoplastic resin (FRTP) formed by impregnating first discontinuous fibers 22 each having a fiber length La with a first thermoplastic resin 20.

The first thermoplastic resin 20 is not particularly limited as long as it has a thermal plasticity. For example, the first thermoplastic resin 20 may be appropriately selected according to an intended application from various thermoplastic resins such as polyethylene (PE), polypropylene (PP), polyethylene terephthalate (PET), and the like.

As the first discontinuous fiber 22, a carbon fiber can be preferably used in view of the heat resistance, strength, stiffness, and the like. However, the first discontinuous fiber 22 is not particularly limited as long as it can act as a reinforcing fiber to reinforce the FRTP. Examples of such reinforcing fibers include glass fibers, metal fibers, ceramic fibers, natural fibers, and aramid fibers, in addition to the carbon fibers.

The fiber length La of the first discontinuous fiber 22 is set such that the first discontinuous fiber 22 can be intertwined with a second discontinuous fiber 24 to be described later, and can be transferred in the first thermoplastic resin 20 with flow of the melted first thermoplastic resin 20. For example, the fiber length La may be 5 to 30 mm.

The connecting member 40 is made up of an FRTP formed by impregnating the second discontinuous fibers 24 each having a fiber length Lb with a second thermoplastic resin 38. It is preferred that the second thermoplastic resin 38 and the second discontinuous fiber 24 contain the same substances as the first thermoplastic resin 20 and the first discontinuous fiber 22 respectively, and the fiber length Lb be substantially equal to the fiber length La. Thus, it is preferred that the connecting member 40 be composed of the same material as the first composite member 10 and the second composite member 12. In this case, the connecting member 40 can be effectively mixed with the first composite member 10 and the second composite member 12 as described below. Therefore, the bonding strength between the first composite member 10 and the second composite member 12 can be further improved.

Nevertheless, the second thermoplastic resin 38 is not particularly limited as long as it has a thermal plasticity. The second discontinuous fiber 24 is not particularly limited as long as it can act as a reinforcing fiber to reinforce the FRTP. The fiber length Lb of the second discontinuous fiber 24 may be set such that the second discontinuous fiber 24 can be intertwined with the first discontinuous fiber 22 and can be transferred in the second thermoplastic resin 38 with flow of the melted second thermoplastic resin 38. For example, the fiber length Lb may be 5 to 30 mm.

A molding apparatus 26 containing the lower mold 14 and the upper mold 16 will be described below. The molding apparatus 26 has a metal mold unit containing the lower mold 14 and the upper mold 16, a drive unit for moving the upper mold 16 (not shown), and first to third heating means (first to third heaters) (not shown).

The lower mold 14 is a stationary mold, and the upper mold 16 is a movable mold that can be moved closer to the lower mold 14 by the drive unit. When the metal mold unit is closed, a cavity 32 corresponding to a desired shape of the fiber-reinforced resin bonded body 18 is formed between the cavity forming surfaces 28, 30 of the lower mold 14 and the upper mold 16 (see FIG. 3).

The lower mold 14 is heated by the first heating means, and the upper mold 16 is heated by the third heating means. For example, rod heaters (not shown), electrically connected to a control circuit (not shown), may be embedded as the first and third heating means in the lower mold 14 and the upper mold 16 respectively. Owing thereto, desired portions of the lower mold 14 and the upper mold 16 can be selectively heated to a molding temperature. In the example of FIGS. 1 to 3, portions 34, 36 to be heated in the lower mold 14 and the upper mold 16 are selectively heated to the molding temperature.

The second heating means heats the connecting member 40 to the molding temperature. For example, a heater, electrically connected to the control circuit, may be used as the second heating means. Thus, the first to third heating means can be driven in association with each other by the control circuit. The molding temperature may be appropriately set depending on the types, shapes, etc. of the first thermoplastic resin 20 and the second thermoplastic resin 38, etc.

A method for producing the fiber-reinforced resin bonded body 18 using the molding apparatus 26 having the above basic structure will be described below.

First, the first composite member 10 and the second composite member 12 are placed on the cavity forming surface 28 of the lower mold 14. In this process, an end surface 10a of the connection end of the first composite member 10 and an end surface 12a of the connection end of the second composite member 12 are arranged facing each other at an interval of a first length L1. The first length L1 is set to be equal to or more than ½ of the fiber length Lb.

Then, the portion 34 of the lower mold 14 is heated to the molding temperature by the first heating means, whereby the first thermoplastic resin 20 in each of the first composite member 10 and the second composite member 12 is partially melted in such a manner that the resultant melted portions extend inward from the end surfaces 10a, 12a over a second length L2. Thus, the melted portions 10b, 12b having the second length L2 are formed respectively at the connection ends of the first composite member 10 and the second composite member 12. The second length L2 is set to be equal to or more than the fiber length La of the first discontinuous fiber 22. The second length L2 may be controlled by adjusting the positions, sizes, etc. of the portions 34, 36 using the first and third heating means.

While the connection ends are heated by the first heating means to form the melted portions 10b, 12b as described above, the connecting member 40 is heated by the second heating means to melt (soften) the second thermoplastic resin 38.

After a heating step is carried out in the above manner, a stack 42 containing the first composite member 10, the second composite member 12, and the connecting member 40 is formed in a stacking step, as shown in FIG. 1. Specifically, after the connection ends of the first composite member 10 and the second composite member 12 are melted on the cavity forming surface 28 of the lower mold 14, the melted connecting member 40 is arranged so as to bridge a space between the melted connection ends, whereby the stack 42 is formed. In the stack 42, the overlap length Lw of the overlapping portion between the connecting member 40 and each of the connection ends is set to be equal to or more than the thickness t of the connecting member 40 and equal to or less than ½ of the second length L2.

Next, as shown in FIGS. 2 and 3, a pressing step is performed in which the upper mold 16 is moved closer to the lower mold 14 with the stack 42 being placed on the cavity forming surface 28 thereof, whereby the stack 42 is pressed from both sides of the stack 42 in the stacking directions. In this process, the heated portions 34, 36 of the lower mold 14 and the upper mold 16 are maintained at the molding temperature by the first and third heating means. Therefore, a pressing force is applied to the stack 42 by the metal mold unit while the melted portions 10b, 12b and the connecting member 40 are maintained in a melt state. In the stack 42, portions in contact with the cavity forming surfaces 28, 30 other than the heated portions 34, 36 are unmelted portions 10c, 12c.

In the pressing step, the melted portions 10b, 12b and the melted connecting member 40 are mixed with each other and caused to flow into a space between the end surfaces 10a, 12a of the connection ends, so that the space is filled with the fluid. As a result, a mixture portion 44 containing mixture of the melted portions 10b, 12b and the connecting member 40 is formed between the connection ends. The mixture portion 44 is formed by flattening the stack 42 under the applied pressing force. Therefore, the thickness of the mixture portion 44 is substantially equal to those of the first composite member 10 and the second composite member 12.

When the melted portions 10b, 12b and the connecting member 40 are caused to flow as described above, the first discontinuous fibers 22 and the second discontinuous fibers 24 also can be transferred in the melted first thermoplastic resin 20 and the melted second thermoplastic resin 38. Even when the second discontinuous fibers 24 are transferred to the space between the end surfaces 10a, 12a by the flow of the melted connecting member 40, since the first length L1 is equal to or more than ½ of the fiber length Lb as described above, the second discontinuous fibers 24 can be prevented from being excessively deformed. Thus, the second discontinuous fibers 24 can be effectively introduced into the space between the end surfaces 10a, 12a and can be suitably intertwined with the first discontinuous fibers 22.

Since the second length L2 is set as described above, the melted portions 10b, 12b have satisfactorily large sizes in comparison with the fiber length La of the first discontinuous fiber 22. Therefore, the ratio of first discontinuous fibers 22 that are prevented from being transferred by reason that the fibers 22 extend from the melted portions 10b, 12b to the unmelted portions 10c, 12c and thus are tied down to the unmelted portions 10c, 12c, to all the first discontinuous fibers 22 in the melted portions 10b, 12b can be effectively reduced. Thus, the first discontinuous fibers 22 can be suitably transferred and can be effectively intertwined with the second discontinuous fibers 24.

Consequently, by setting the first length L1 and the second length L2 as described above, the first discontinuous fibers 22 and the second discontinuous fibers 24 can be effectively intertwined with each other and can be substantially uniformly dispersed in the mixture portion 44.

Furthermore, since the overlap length Lw is equal to or more than the thickness t of the connecting member 40, the contact area between the connecting member 40 and the connection end can be satisfactorily increased in the stack 42. Therefore, the connecting member 40 and the connection ends can be suitably transferred and mixed with each other by applying the pressing force to the stack 42 in the pressing step. Thus, the first discontinuous fibers 22 and the second discontinuous fibers 24 can be effectively intertwined with each other.

In the vicinity of the boundaries between the melted portions 10b, 12b and the unmelted portions 10c, 12c, compared to the other melted portions 10b, 12b, the ratio of the first discontinuous fibers 22 that are tied down to the unmelted portions 10c, 12c and thus prevented from being transferred tends to be increased. Therefore, even if the connecting member 40 is stacked and pressed near the boundaries, the first discontinuous fibers 22 are not readily transferred or suitably intertwined with the second discontinuous fibers 24 near the boundaries. In the production method of this embodiment, since the overlap length Lw is equal to or less than ½ of the second length, the distance between each end of the connecting member 40 and the boundary can be sufficiently increased, and the first discontinuous fibers 22 and the second discontinuous fibers 24 can be effectively intertwined with each other.

Thus, by setting the overlap length Lw within the above-described range, the first discontinuous fibers 22 and the second discontinuous fibers 24 can be effectively intertwined with each other and can be substantially uniformly dispersed in the mixture portion 44.

Figure 4:
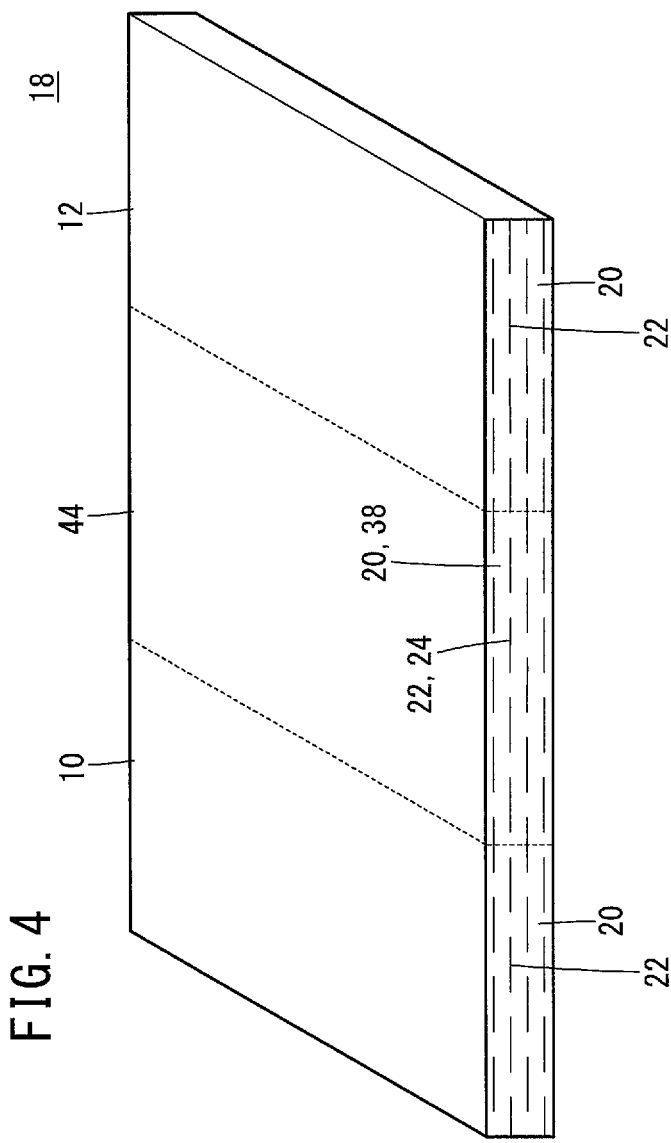
FIG. 4 is a perspective schematic structural view of a fiber-reinforced resin bonded body separated from the lower and upper molds of FIG. 3.

Next, a solidifying step is performed in which the heating by the first and third heating means is stopped, and the inside of the cavity 32 is cooled. In the above manner, the mixture portion 44 is cooled and solidified, and thereafter the lower mold 14 and the upper mold 16 are opened, and the fiber-reinforced resin bonded body 18 shown in FIG. 4 is separated from the metal mold unit. In the fiber-reinforced resin bonded body 18, the first composite member 10 and the second composite member 12 are bonded to each other by the mixture portion 44. Thus, the mixture portion 44 can function as a connection of the first composite member 10 and the second composite member 12. Consequently, in the production method of this embodiment, the bonding strength between the first composite member 10 and the second composite member 12 can be effectively increased, and the fiber-reinforced resin bonded body 18 can be obtained with excellent mechanical properties.

Since the thickness of the mixture portion 44 is substantially equal to those of the first composite member 10 and the second composite member 12 as described above, the fiber-reinforced resin bonded body 18 can be produced without forming any step structures in the connection of the connection ends. Therefore, deterioration of the appearance design, aerodynamic properties, and the like of the fiber-reinforced resin bonded body 18 can be effectively prevented. In addition, thickness increase in the connection portion can be avoided. Therefore, the fiber-reinforced resin bonded body 18 can be easily produced with a desired shape and a satisfactorily reduced weight.

Second Embodiment

A production method according to a second embodiment of the present invention will be described below with reference to FIGS. 1 to 4. In the production method of the second embodiment, the first composite member 10, the second composite member 12, and the connecting member 40 are stacked in the unmelted states to form the stack 42. Then, the stack 42 is heated and melted between the lower mold 14 and the upper mold 16. The second embodiment is different from the first embodiment in this respect. Except for this respect, in the same manner as the production method of the first embodiment, the fiber-reinforced resin bonded body 18 is produced by bonding the connection ends of the first composite member 10 and the second composite member 12 through the connecting member 40 in the molding apparatus 26.

Thus, in the production method of the second embodiment, first, the stack 42 containing the first composite member 10, the second composite member 12, and the connecting member 40 is formed as shown in FIG. 1 in a stacking step. Specifically, the first composite member 10 and the second composite member 12 are placed on the cavity forming surface 28 of the lower mold 14. In this process, the end surface 10*a* of the connection end of the first composite member 10 and the end surface 12*a* of the connection end of the second composite member 12 are arranged facing each other at an interval of the first length L1.

Then, the connecting member 40 is placed so as to bridge a space between the connection ends to thereby form the stack 42. In this process, the overlap length Lw of the overlapping portion between the connecting member 40 and each of the connection ends is set to be equal to or more than the thickness t of the connecting member 40 and equal to or less than ½ of the second length L2.

As shown in FIG. 2, the stack 42 is interposed (sandwiched) and heated between the lower mold 14 and the upper mold 16 in a heating step. In the heating step, the second thermoplastic resin 38 in the connecting member 40 is melted, and the first thermoplastic resins 20 in the first composite member 10 and the second composite member 12 are partially melted so as to form the melted portions 10*b*, 12*b* having the second length L2 at the connection ends.

Thus, in the production method of the second embodiment, the portions 34, 36 in the lower mold 14 and the upper mold 16 are heated to the molding temperature by the first and third heating means to melt a predetermined area of the stack 42 containing the connecting member 40. Therefore, it is not necessary to use the second heating means for heating and melting the connecting member 40.

As shown in FIG. 3, the lower mold 14 and the upper mold 16 are moved further closer to each other, and the mold unit is closed to press the thus-melted stack 42 from both sides of the stack 42 in the stacking directions. In this step, the melted portions 10*b*, 12*b* and the melted connecting member 40 are mixed with each other and caused to flow into the space between the end surfaces 10*a*, 12*a* of the connection ends, so that the space is filled with the fluid. As a result, the mixture portion 44 containing mixture of the melted portions 10*b*, 12*b* and the connecting member 40 is formed between the connection ends.

Then, the process flow is carried out in the same manner as the production method of the first embodiment to produce the fiber-reinforced resin bonded body 18 shown in FIG. 4.

The production method of the second embodiment has the same advantageous effects as the production method of the first embodiment. Thus, the bonding strength between the first composite member 10 and the second composite member 12 can be effectively increased, and the fiber-reinforced resin bonded body 18 can be easily produced with excellent mechanical properties. Furthermore, since the thickness of the mixture portion 44 is substantially equal to those of the first composite member 10 and the second composite member 12, the fiber-reinforced resin bonded body 18 can be produced without forming any step structures in the connection of the connection ends. Therefore, deterioration of the appearance design, aerodynamic properties, and the like of the fiber-reinforced resin bonded body 18 can be effectively prevented. In addition, thickness increase in the connection portion can be avoided. Therefore, the fiber-reinforced resin bonded body 18 can be easily produced with a desired shape and a satisfactorily reduced weight.

Third Embodiment

Figure 5:
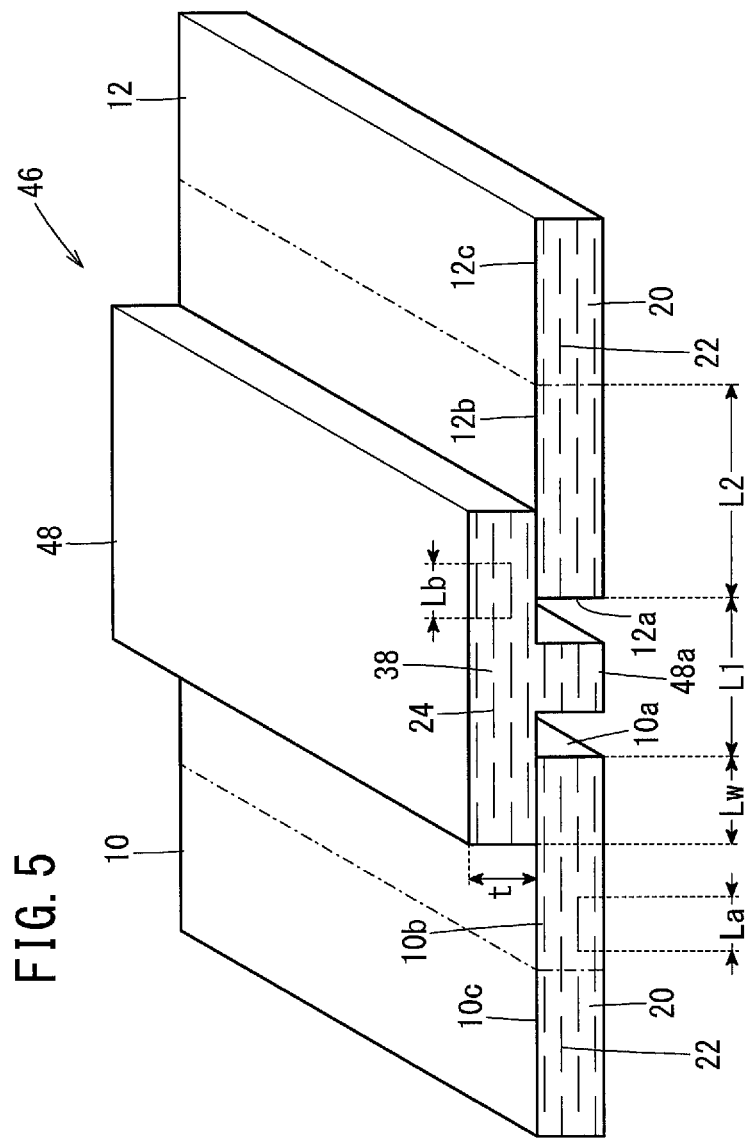
FIG. 5 is a perspective schematic structural view of a stack formed in a fiber-reinforced resin bonded body production method according to a third embodiment of the present invention.

A production method according to a third embodiment of the present invention will be described below with reference mainly to FIG. 5. Several components in FIG. 5 that are equal or similar in functions and effects to those in FIGS. 1 to 4, are denoted by the same reference numerals, and detailed explanations thereof are omitted.

The production method of the third embodiment is the same as those of the first and second embodiments except that a stack 46 is formed instead of the stack 42 in the stacking step. The stack 46 is the same as the stack 42 except that a connecting member 48 is used instead of the connecting member 40.

Specifically, in the stacking step of the third embodiment, the end surfaces 10*a*, 12*a* are arranged facing each other at an interval of the first length L1, and the connecting member 48 is placed so as to bridge a space between the connection ends of the first composite member 10 and the second composite member 12 to thereby form the stack 46. The connecting member 48, as is the case with the connecting member 40, is made up of the FRTP provided by impregnating the second discontinuous fibers 24 with the second thermoplastic resin 38. The connecting member 48 has a protrusion 48*a*. The protrusion 48*a* projects from a surface of the connecting member 48 that faces the first composite member 10 and the second composite member 12 and is positioned between the end surfaces 10*a*, 12*a*. It should be noted that the thickness t of the connecting member 48 excludes the length of the protrusion 48*a*.

When the stack 46 is subjected to the pressing step, since the protrusion 48*a* is interposed between the end surfaces 10*a*, 12*a*, the melted portions 10*b*, 12*b* and the connecting member 48 can be more suitably mixed with each other. Therefore, it is possible to easily produce the mixture portion 44 in which the first discontinuous fibers 22 and the second discontinuous fibers 24 are effectively intertwined with each other and substantially uniformly dispersed. Consequently, the bonding strength between the connection ends can be more effectively increased, and the fiber-reinforced resin bonded body 18 can be obtained with more excellent mechanical properties.

Fourth Embodiment

Figure 6:
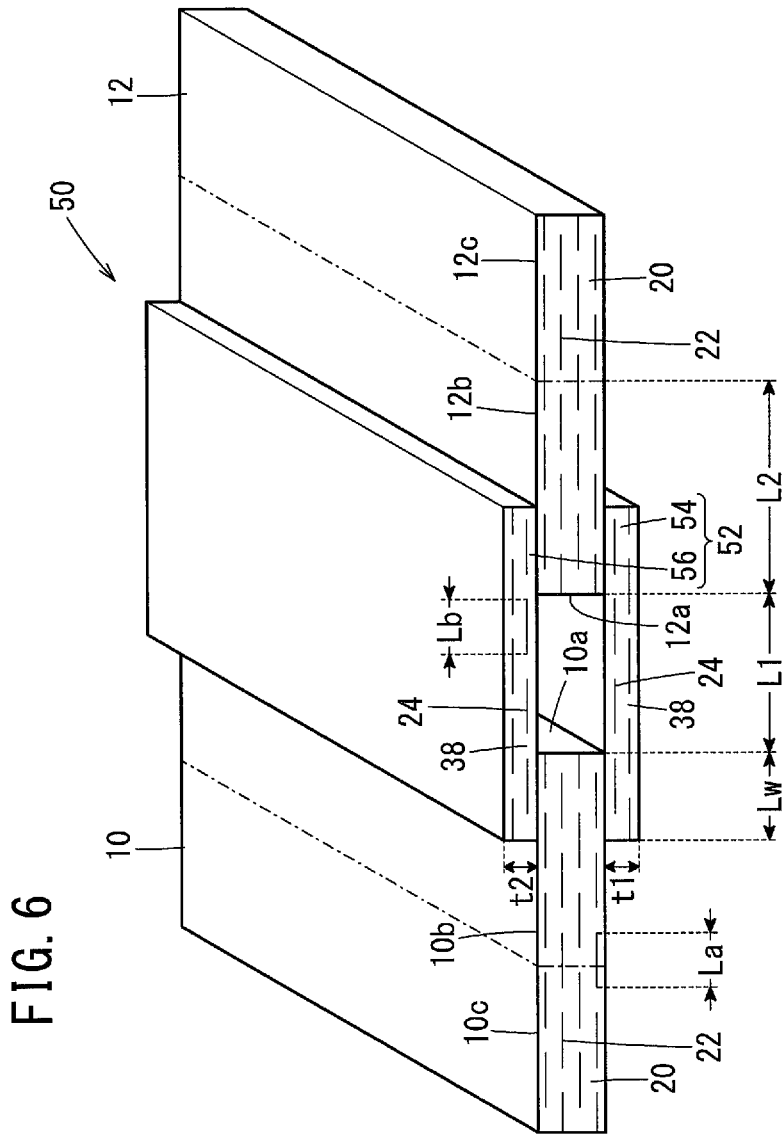
FIG. 6 is a perspective schematic structural view of a stack formed in a fiber-reinforced resin bonded body production method according to a fourth embodiment of the present invention.

A production method according to a fourth embodiment of the present invention will be described below with reference mainly to FIG. 6. Several components in FIG. 6 that are equal or similar in functions and effects to those in FIGS. 1 to 5, are denoted by the same reference numerals, and detailed explanations thereof are omitted.

The production method of the fourth embodiment is the same as those of the first and second embodiments except that a stack 50 is formed, instead of the stack 42, in the stacking step. The stack 50 is the same as the stack 42 except that a connecting member 52 is used instead of the connecting member 40.

The connecting member 52 contains a first connecting part 54 and a second connecting part 56. The first connecting part 54 and the second connecting part 56, as with the connecting member 40, are each made up of the FRTP provided by impregnating the second discontinuous fibers 24 with the second thermoplastic resin 38. The volume of the connecting member 52, which corresponds to the total volume d of the first connecting part 54 and the second connecting part 56, is substantially equal to the volume obtained by multiplying the first length L1 by the area of a portion of the end surface 10a facing the end surface 12a. Thus, the volume of the connecting member 52 is set to be substantially equal to the volume of the space between the end surfaces 10a, 12a.

The area of the portion of the end surface 10a facing the end surface 12a is substantially equal to the area of a portion of the end surface 12a facing the end surface 10a.

The total of the thickness t1 of the first connecting part 54 and the thickness t2 of the second connecting part 56 is regarded as the thickness t of the connecting member 52. Each of the first connecting part 54 and the second connecting part 56 is placed on the connection ends while having the overlap length Lw, to thereby form the stack 50. Thus, also in the stack 50, the overlap length Lw is equal to or more than the thickness t of the connecting member 52 and equal to or less than ½ of the second length L2.

In the stacking step of the fourth embodiment, the stack 50 is formed in such a manner that the first connecting part 54 is placed on one side of the stack 50 in the stacking direction and the second connecting part 56 is placed on the other side thereof in the stacking direction. When the stack 50 is subjected to the above pressing step, the first connecting part 54 and the second connecting part 56 flow from both sides of the stack 50 in the stacking direction into the space between the end surfaces 10a, 12a to thereby form the mixture portion 44. Therefore, the melted portions 10b, 12b and the connecting member 52 can be more suitably mixed with each other, whereby the first discontinuous fibers 22 and the second discontinuous fibers 24 can be intertwined with each other and can be substantially uniformly distributed also in the stacking direction in the mixture portion 44. Consequently, the bonding strength between the connection ends can be more effectively increased, and the fiber-reinforced resin bonded body 18 can be obtained with more excellent mechanical properties.

The present invention is not particularly limited to the aforementioned embodiments. Various changes and modifications may be made to the embodiments without departing from the scope of the invention.

For example, though the overlap length Lw is equal to or more than the thickness t of the connecting member 40, 48, 52 and equal to or less than ½ of the second length L2 in the above first to fourth embodiments, the overlap length Lw is not particularly limited thereto. The overlap length Lw may be arbitrarily selected as long as the connection ends of the first composite member 10 and the second composite member 12 can be suitably bonded to each other by the mixture portion 44 of the connecting member 40, 48, 52 and the melted portions 10b, 12b.

What is claimed is:

1. A method for producing a fiber-reinforced resin bonded body, for heating connection ends of a first composite member and a second composite member and thereafter pressing the connection ends between a lower mold and an upper mold to bond the connection ends, the first composite member and the second composite member each containing a first thermoplastic resin and first discontinuous fibers having a fiber length La,
the method comprising:
a heating step, in which the first composite member and the second composite member are placed on the lower mold in such a manner that end surfaces of the connection ends are arranged facing each other at an interval of a first length, the lower mold is heated by a first heater to melt portions of the first composite member and the second composite member in such a manner that the melted portions extend inward from the end surfaces over a second length, and a connecting member containing a second thermoplastic resin and second discontinuous fibers having a fiber length Lb is heated and melted by a second heater;
a stacking step, in which the melted connecting member is placed so as to bridge a space between the melted connection ends to thereby form a stack;
a pressing step, in which the lower mold and the upper mold are moved closer to each other to press the stack, whereby the melted portions of the connection ends and the melted connecting member are caused to flow into the space between the end surfaces and are mixed with each other to form a mixture portion; and
a solidifying step, in which the mixture portion is cooled and solidified, whereby the first composite member and the second composite member are bonded by the mixture portion to produce the fiber-reinforced resin bonded body,
wherein the first length is equal to or more than ½ of the fiber length Lb, and the second length is equal to or more than the fiber length La.

2. The method according to claim 1, wherein
in the stacking step, an overlap length of an overlapping portion between the connecting member and each of the connection ends is equal to or more than thickness of the connecting member and equal to or less than ½ of the second length.

3. The method according to claim 1, wherein
the connecting member has a protrusion projecting from a surface thereof facing the first composite member and the second composite member, and the protrusion is positioned between the end surfaces in the stack.

4. The method according to claim 1, wherein
the connecting member contains a first connecting part and a second connecting part,
total volume of the first connecting part and the second connecting part is substantially equal to a volume obtained by multiplying an area of a facing portion of the end surfaces facing each other by the first length, and
in the stacking step, the first connecting part is placed at one side of the stack in the stacking direction, and the second connecting part is placed at another side thereof in the stacking direction.

5. A method for producing a fiber-reinforced resin bonded body, for heating while pressing connection ends of a first composite member and a second composite member between a lower mold and an upper mold to bond the connection ends, the first composite member and the second composite member each containing a first thermoplastic resin and first discontinuous fibers having a fiber length La, the method comprising:

a stacking step, in which the first composite member and the second composite member are placed in such a manner that end surfaces of the connection ends are arranged facing each other at an interval of a first length, and a connecting member containing a second thermoplastic resin and second discontinuous fibers having a fiber length Lb is placed so as to bridge a space between the connection ends to thereby form a stack;

a heating step, in which the stack is sandwiched between the lower mold and the upper mold and is heated to melt the connecting member and also melt portions of the first composite member and the second composite member in such a manner that the melted portions extend inward from the end surfaces over a second length;

a pressing step, in which the lower mold and the upper mold are moved closer to each other to press the stack, whereby the melted portions of the connection ends and the melted connecting member are caused to flow into the space between the end surfaces and are mixed with each other to form a mixture portion; and a solidifying step, in which the mixture portion is cooled and solidified, whereby the first composite member and the second composite member are bonded by the mixture portion to produce the fiber-reinforced resin bonded body, wherein the first length is equal to or more than ½ of the fiber length Lb, and the second length is equal to or more than the fiber length La.

* * * * *